(12) United States Patent
Egashira et al.

(10) Patent No.: US 7,649,832 B2
(45) Date of Patent: Jan. 19, 2010

(54) WIRELESS COMMUNICATION METHOD USING OFDM, OFDM RECEIVING METHOD AND APPARATUS THEREOF

(75) Inventors: Yoshimasa Egashira, Yokohama (JP); Yasuhiko Tanabe, Kawasaki (JP)

(73) Assignee: Kabushiki Kaisha Toshiba, Minato-ku, Tokyo (JP)

( * ) Notice: Subject to any disclaimer, the term of this patent is extended or adjusted under 35 U.S.C. 154(b) by 388 days.

(21) Appl. No.: 11/824,028

(22) Filed: Jun. 29, 2007

(65) Prior Publication Data

US 2008/0037410 A1 Feb. 14, 2008

(30) Foreign Application Priority Data

Jul. 5, 2006 (JP) ............................. 2006-185878

(51) Int. Cl.
*H04J 11/00* (2006.01)

(52) U.S. Cl. .................... 370/206; 370/208; 375/235; 375/261; 375/347

(58) Field of Classification Search ...................... None
See application file for complete search history.

(56) References Cited

U.S. PATENT DOCUMENTS 6,128,276 A * 10/2000 Agee .......................... 370/208
2003/0231726 A1 * 12/2003 Schuchert et al. ........... 375/350

FOREIGN PATENT DOCUMENTS

JP       2001-119364       4/2001

OTHER PUBLICATIONS

U.S. Appl. No. 11/669,478, filed Jan. 31, 2007, Yoshimasa Egashira.

Schuchert, et al., "*A Novel IQ Imbalance Compensation Scheme for the Reception of OFM Signals*"; IEEE Trans. Cons. Elect., vol. 43, No. 3, pp. 313-318, Aug. 2001.

Kirkland, et al., "*I/Q Distortion Correction for OFDM Direct Conversion Receiver*"; IEE Electronics Letters, vol. 39, No. 1, pp. 131-133, Jan. 2003.

* cited by examiner

*Primary Examiner*—Chi H Pham
*Assistant Examiner*—David Andreasen
(74) *Attorney, Agent, or Firm*—Ohlandt, Greeley, Ruggiero & Perle, L.L.P.

(57) ABSTRACT

A receiving method receiving an OFDM signal including a first OFDM symbol having first and second pilot signals allocated to first and second subcarriers positioned symmetric on the frequency axis, and a second OFDM symbol having third and fourth pilot signals allocated to the first and the second subcarriers, a difference between a product of the first pilot signal and a complex conjugate of the fourth pilot signal and a product of the third pilot signal and a complex conjugate of the second pilot signal being non-zero, estimating a first coefficient representing a change components of an amplitude and a phase, and a second coefficient representing an interference component, using first and second received pilot signals corresponding to the first and third pilot signals, estimating from the first and second coefficients IQ imbalance, and compensating the influence of amplitude and phase errors in accordance with the IQ imbalance.

20 Claims, 4 Drawing Sheets

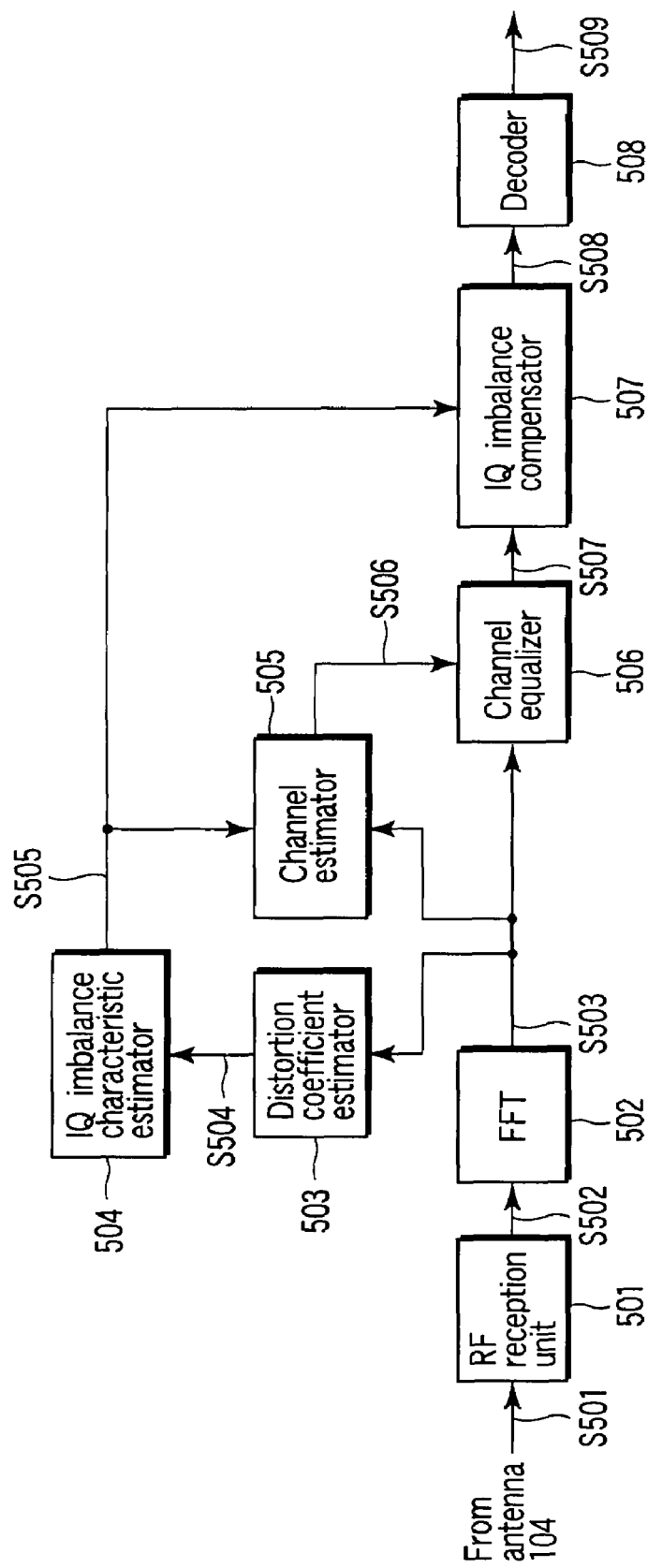
F I G. 5

WIRELESS COMMUNICATION METHOD USING OFDM, OFDM RECEIVING METHOD AND APPARATUS THEREOF

CROSS-REFERENCE TO RELATED APPLICATIONS

This application is based upon and claims the benefit of priority from prior Japanese Patent Application No. 2006-185878, filed Jul. 5, 2006, the entire contents of which are incorporated herein by reference.

BACKGROUND OF THE INVENTION

1. Field of the Invention

The present invention relates to a wireless communication method using orthogonal frequency division multiplexing (OFDM), an OFDM receiving method and an apparatus thereof.

2. Description of the Related Art

In a multipath channel, in an environment where signals arrive with different propagation delay time, wave distortion caused by intersymbol interference can be a major factor of deteriorating communication quality. An orthogonal frequency division multiplexing (OFDM) scheme is known as a scheme to reduce wave distortion which occurs when receiving signals with different propagation delay time.

When performing frequency conversion to convert signals of a baseband to signals of a high frequency band, a wireless transmitter uses a quadrature modulator. In the case where this quadrature modulator is comprised of an analogue circuit, the incompleteness of the analogue circuit causes an amplitude error or a phase error between an inphase component and a quadrature component, which is referred to as IQ imbalance. In the case where the IQ imbalance occurs in the quadrature modulator, two subcarrier signals (subcarrier pair) among the OFDM signal subcarriers, which are symmetric with respect to a center frequency, interfere with each other. Such mutual interference significantly deteriorates receiving quality.

To eliminate mutual interference between the subcarrier pairs, JP-A 2001-119364 (KOKAI) suggests a scheme to estimate and compensate mutual interference quantity caused by IQ imbalance for each subcarrier pair. In this scheme, a channel estimation preamble signal consisting of a particular structure is transmitted, and the receiving side uses the preamble signal to estimate the mutual interference quantity between the subcarriers caused by the IQ imbalance.

As mentioned above, when estimating the mutual interference quantity between each subcarrier pair caused by IQ imbalance, the technique described in JP-A 2001-119364 (KOKAI) uses a different particularly structured channel estimation preamble signal for each subcarrier pair. Therefore, there is a problem that the overhead of the channel estimation preamble signal increases.

BRIEF SUMMARY OF THE INVENTION

According to an aspect of the present invention, a wireless communication method comprising: generating an OFDM signal containing a first OFDM symbol having a first transmitting pilot signal and a second transmitting pilot signal respectively allocated to a first subcarrier and a second subcarrier being symmetric with respect to a center frequency on a frequency axis, and a second OFDM symbol having a third transmitting pilot signal and a fourth transmitting pilot signal respectively allocated to the first subcarrier and the second subcarrier, a difference between a product of the first transmitting pilot signal and a complex conjugate of the fourth transmitting pilot signal and a product of the third transmitting pilot signal and a complex conjugate of the second transmitting pilot signal being non-zero; transmitting the generated OFDM signal after applying an quadrature modulation; receiving the transmitted OFDM signal to output a received OFDM signal; extracting a first received pilot signal corresponding to the first subcarrier in the first OFDM symbol zone of the received OFDM signal; extracting a second received pilot signal corresponding to the first subcarrier in the second OFDM symbol zone of the received OFDM signal; estimating a first coefficient representing a change component of an amplitude and a phase which occur in the first subcarrier, and a second coefficient representing an interference component provided to the first subcarrier by the second subcarrier, using the extracted first received pilot signal and the second received pilot signal; estimating from the estimated first coefficient and the second coefficient an IQ imbalance characteristic uniquely determining an amplitude error and a phase error occurred upon the quadrature modulation of the transmitted OFDM signal; compensating an influence of the amplitude error and phase error for the received OFDM signal in accordance with the estimated IQ imbalance characteristic; and decoding the compensated OFDM signal.

According to another aspect of the present invention, an OFDM receiver comprising: a reception unit configured to output a received OFDM signal by receiving an OFDM signal transmitted after undergone quadrature modulation, the OFDM signal including a first OFDM symbol having a first transmitting pilot signal and a second transmitting pilot signal allocated respectively to a first subcarrier and a second subcarrier positioned symmetric on the frequency axis with respect to a center frequency, and a second OFDM symbol having a third transmitting pilot signal and a fourth transmitting pilot signal allocated respectively to the first subcarrier and the second subcarrier, a difference between a product of the first transmitting pilot signal and a complex conjugate of the fourth transmitting pilot signal and the product of the third transmitting pilot signal and a complex conjugate of the second transmitting pilot signal being non-zero; a first estimator to estimate a first coefficient representing a change component of an amplitude and a phase occurred in the first subcarrier, and a second coefficient representing an interference component provided to the first subcarrier by the second subcarrier using a first received pilot signal corresponding to the first transmitting pilot signal within the received OFDM signal and a second received pilot signal corresponding to the third transmitting pilot signal within the received OFDM signal; a second estimator to estimate from the estimated first coefficient and the second coefficient an IQ imbalance characteristic uniquely determining an influence of an amplitude error and a phase error occurred upon the quadrature modulation of the transmitted OFDM signal; a compensator to compensate the influence of the amplitude error and the phase error for the received OFDM signal in accordance with the estimated IQ imbalance characteristic; and a decoder to decode the compensated OFDM signal.

BRIEF DESCRIPTION OF THE SEVERAL VIEWS OF THE DRAWING

FIG. 5 is a block diagram showing an OFDM signal receiver according to the first and second embodiments.

DETAILED DESCRIPTION OF THE INVENTION

Hereinafter, embodiments of the present invention will be described in detail with reference to the accompanying drawings.

First Embodiment

Figure 1:
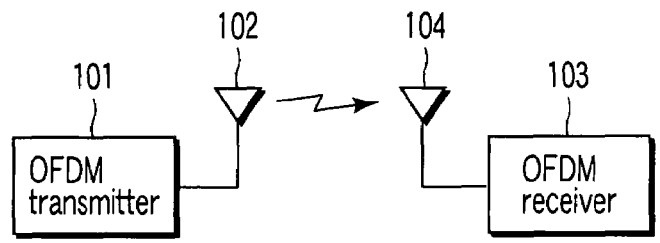
FIG. 1 is a schematic view of an OFDM communication system according to first and second embodiments.

As illustrated in FIG. 1, in an OFDM wireless communication system according to a first embodiment of the present invention, an OFDM signal is transmitted from an OFDM transmitter 101 having a transmitting antenna 102. The transmitted OFDM signal is received by an OFDM receiver 103 having a receiving antenna 104. Here, the OFDM transmitter 101 and OFDM receiver 103 are described as having one antenna each. However, the OFDM transmitter may have a plurality of transmitting antennas and the OFDM receiver may have a plurality of receiving antennas.

Figure 2:
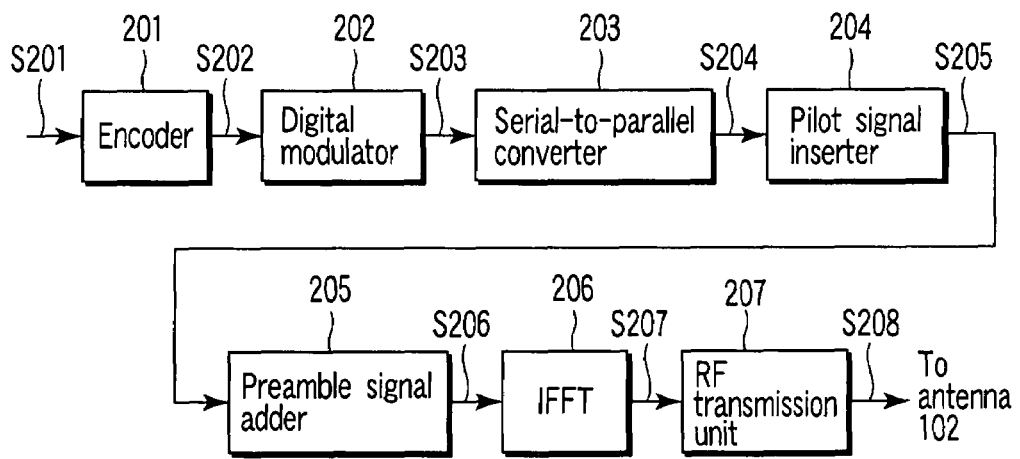
FIG. 2 is a block diagram showing an OFDM signal transmitter according to the first and second embodiments.

The structure of the OFDM transmitter 101 illustrated in FIG. 1 will be explained using FIG. 2. The OFDM transmitter 101 comprises an encoder 201, a digital modulator 202, a serial-to-parallel converter 203, a pilot signal inserter 204, a preamble signal adder 205, an IFFT (inverse fast Fourier transform) unit 206 and an RF transmission unit 207 including a quadrature modulator.

The input transmitting data S201 is coded by the encoder 201. The coded data S202 is subject to digital modulation by the digital modulator 202, such as by binary phase shift keying (BPSK), quadrature phase shift keying (QPSK), 16 quadrature amplitude modulation (16QAM) and 64QAM. The serial-to-parallel converter 203 allocates the modulated data signal S203 output from the digital modulator 202 to a subcarrier (data subcarrier) for transmitting data signals.

The modulated data S204 allocated to the data subcarrier is input to the pilot signal inserter 204. The pilot signal inserter 204 inserts a known signal, referred to as a pilot signal which is transmitted by a subcarrier (pilot subcarrier) positioned between the data subcarriers, into the modulated data S204. In other words, the pilot signal inserter 204 allocates the pilot signal to the pilot subcarrier. Here, to "allocate a data signal or a pilot signal to a subcarrier" means to add a subcarrier index to the data signal or the pilot signal. The subcarrier index represents the position of the subcarrier on the time axis and the frequency axis to which the data signal or the pilot signal should be allocated. Meanwhile, to differentiate the pilot signal in the OFDM signal received by the OFDM receiver described latter, the pilot signal transmitted from the OFDM transmitter will be referred to as a transmitting pilot signal.

The output signal (the pilot signal and the data signal respectively allocated to the pilot subcarrier and the data subcarrier) S205 from the pilot signal inserter 204 is input to the preamble signal adder 205. The preamble signal adder 205 adds a known signal for channel estimation referred to as a channel estimation preamble before the signal S205.

The signal S206 output from the preamble signal adder 205 is input to the inverse fast Fourier transform (IFFT) unit 206. As a result of inverse fast Fourier transform by the IFFT unit 206, the signal S206 is converted into the OFDM signal S207 on the time axis. The OFDM signal S207 is input to the RF transmission unit 207. The RF transmission unit 207 converts the OFDM signal S207 into an analogue signal, then, further into a wireless frequency band signal by frequency conversion and generates a transmitting OFDM signal. The transmitting OFDM signal is transmitted by the transmit antenna 102.

Figure 3:
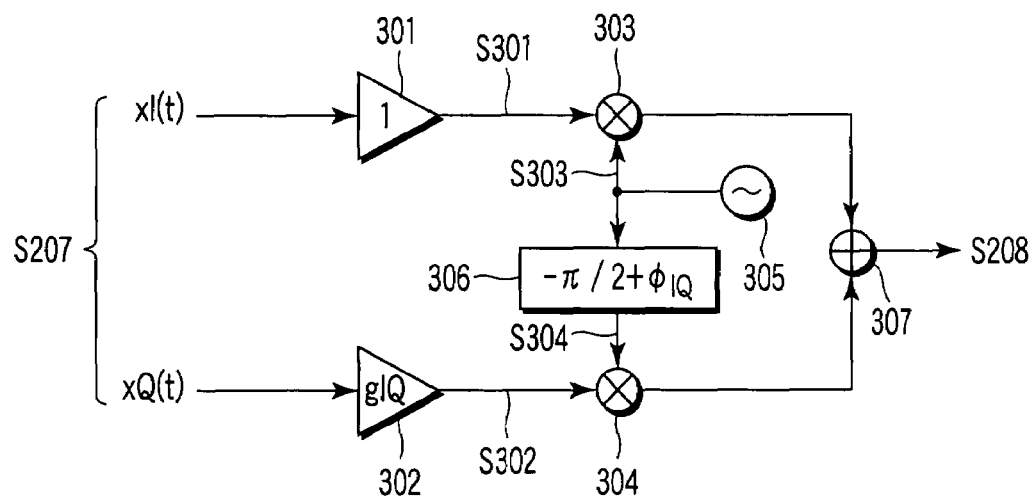
FIG. 3 shows a simplified model of an RF transmission unit in FIG. 2.

FIG. 3 illustrates a simplified model of the RF transmission unit 207. The inphase component and quadrature component of the signal S207 which are output from the IFFT unit 206 are output to multipliers 303 and 304 constituting the quadrature modulator, via output units 301 and 302 comprised of such as a digital-analogue converter and a filter. The multipliers 303 and 304 multiply the inphase component signal S301 and the quadrature component signal S302 respectively by two local signals S303 and S304 ideally having a phase difference of $-\pi/2$. The local signal S303 is generated by an oscillator 305, and the local signal S304 is generated by a phase shifter 306 which shifts the phase of the local signal S303 by $-\pi/2$. The output signals from the multipliers 303 and 304 are added together in an adder 307, and transmitted by the transmitting antenna 102.

When the RF transmission unit 207 as shown in FIG. 3 consists of an analogue circuit, it is difficult to obtain an accurate phase difference of $-\pi/2$ between the local signals S303 and S304. In other words, in practice, the phase error shown as $\phi_{IQ}$ within the block of the phase shifter 306 in FIG. 3 occurs in the above phase difference. Similarly, as for the amplitude of the local signals S303 and S304, an amplitude error shown as $g_{IQ}$ in FIG. 3 occurs between the local signals S303 and S304 due to characteristic difference of the output units 301 and 302. Such phase error and amplitude error are collectively referred to as IQ imbalance.

Figure 4:
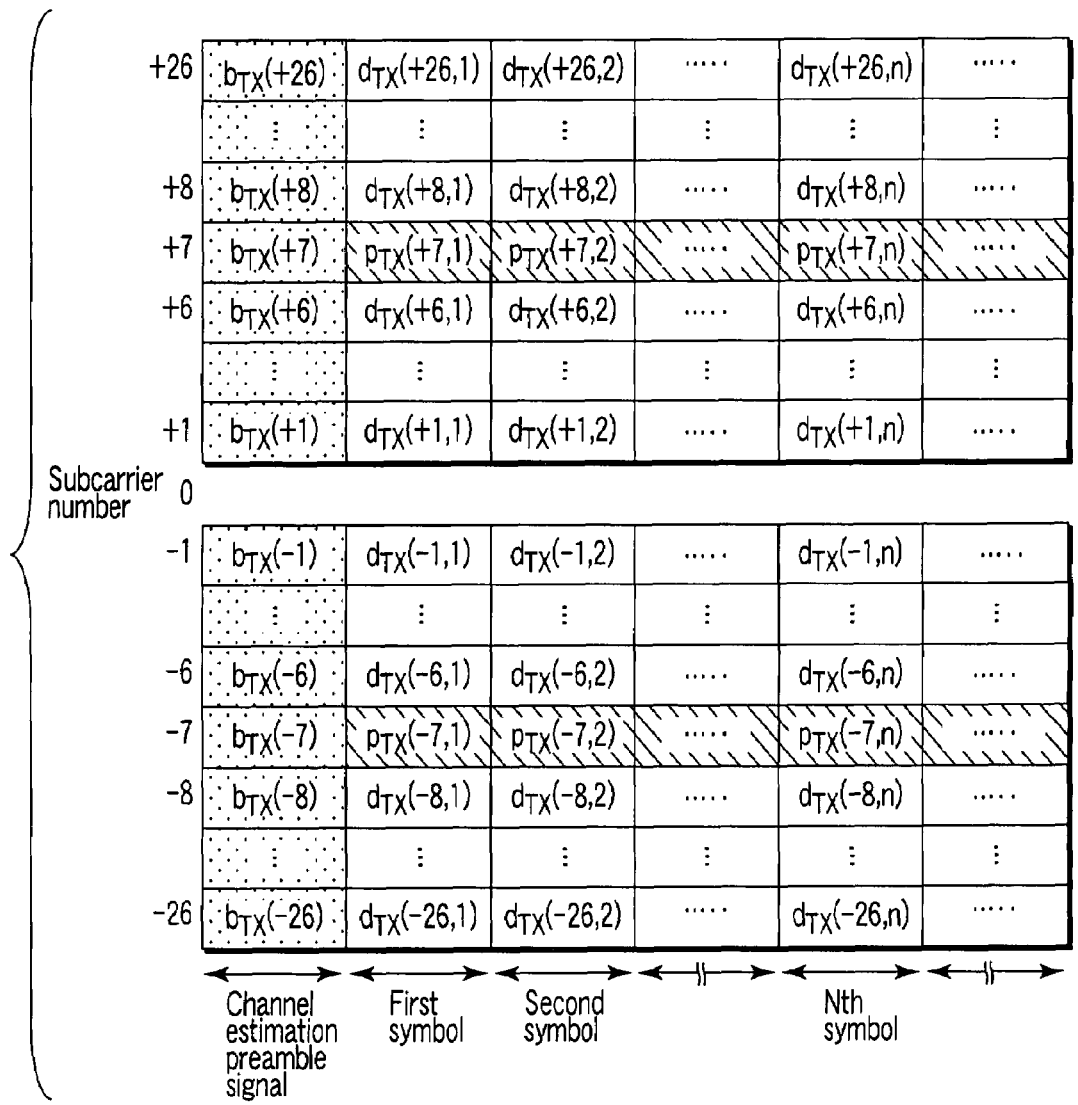
FIG. 4 shows a subcarrier arrangement of an OFDM signal transmitted according to the first embodiment.

Now, using FIG. 4, the frame structure of the transmitting OFDM signal generated in the OFDM transmitter 101 will be explained in detail, particularly, with regard to the structure of the transmitting pilot signal.

The OFDM transmitter 101 transmits a channel estimation preamble signal $b_{Tx}(k)$ prior to transmitting the data signal. $b_{Tx}(k)$ represents a signal value of a channel estimation preamble allocated to the kth subcarrier. After the channel estimation preamble signal is transmitted, the transmitting pilot signal $p_{Tx}(k,n)$ is transmitted simultaneously with the data signal $d_{Tx}(k,n)$. Here, $d_{Tx}(k,n)$ and $p_{Tx}(k,n)$ respectively represent the data signal value and the transmitting pilot signal value transmitted in the nth symbol of the kth subcarrier. The channel estimation preamble signal $b_{Tx}(k,n)$ and the transmitting pilot signal $p_{Tx}(k,n)$ are known signals in the OFDM receiver 103.

The transmitting pilot signal $\{p_{Tx}(+7,n_1), pTx(-7,n_1)\}$ allocated to the $+7^{th}$ and $-7^{th}$ subcarriers, which is to be transmitted in the $n_{1st}$ symbol (by the $1^{st}$ OFDM symbol), and the transmitting pilot signal $\{p_{Tx}(+7,n_2), pTx(-7,n_2)\}$ allocated to the $+7^{th}$ and $-7^{th}$ subcarriers, which is to be transmitted in the $n_{2nd}$ symbol (by the $2^{nd}$ OFDM symbol), satisfy the condition of the following equation.

$$p_{Tx}(+7,n_1)p_{Tx}*(-7,n_2)-p_{Tx}(+7,n_2)p_{Tx}*(-7,n_1) \neq 0 \quad (1\text{-}1)$$

Further, preferably, $\{p_{Tx}(+7,n_1), p_{Tx}(-7,n_1)\}$ and $\{p_{Tx}(+7,n_2), p_{Tx}(-7,n_2)\}$ satisfy the condition shown in the following equation.

$$p_{Tx}(+7,n_1)p_{Tx}(+7,n_2)+p_{Tx}*(-7,n_1)p_{Tx}*(-7,n_2)=0 \quad (2\text{-}1)$$

In the case where the transmitting pilot signals satisfy the condition of the above equation, the estimation accuracy of the IQ imbalance under a noise environment improves, thereby bringing about an advantage of improving the compensation accuracy of the IQ imbalance.

Here, the $n_{1st}$ and $n_{2nd}$ symbols (the first OFDM symbol and the second OFDM symbol) including transmitting pilot signals satisfying equation (1-1) are described as the $1^{st}$ symbol and $2^{nd}$ symbol. However, as this is only an example, the transmitting pilot signals which satisfy equation (1-1) may be included in any two symbols (for example, a $3^{rd}$ symbol and a $7^{th}$ symbol, a channel estimation preamble and a $4^{th}$ symbol).

For example, the following equations (3), (4) and (5) can be cited as the combinations of $p_{Tx}(+7,1)$, $p_{Tx}(-7,1)$, $p_{Tx}(+7,2)$ and $p_{Tx}(-7,2)$ which simultaneously satisfy the two conditions shown in equations (1-1) and (2-1).

$$\{p_{Tx}(+7,1), p_{Tx}(-7,1)\} = \{1,1\}$$

$$\{p_{Tx}(+7,2), p_{Tx}(-7,2)\} = \{1,-1\} \quad (3)$$

$$\{p_{Tx}(+7,1), p_{Tx}(-7,1)\} = \{1,1\}$$

$$\{p_{Tx}(+7,2), p_{Tx}(-7,2)\} = \{j,j\} \quad (4)$$

$$\{p_{Tx}(+7,1), p_{Tx}(-7,1)\} = \{1-j, 1+j\}$$

$$\{p_{Tx}(+7,2), p_{Tx}(-7,2)\} = \{1+j, -1+j\} \quad (5)$$

where j represents imaginary unit.

The transmitting pilot signals are not restricted to the combination of equations (3), (4) and (5), and it is possible to use any pilot signal satisfying equation (1-1) and, preferably, equation (2-1).

Here, the subcarrier number used for the transmitting pilot signal is $k=\pm 7$. However, this is not restricted. As long as a pair of subcarriers positioned symmetric with respect to the $0^{th}$ subcarrier, which is the center frequency, (that is, the +Kth subcarrier and the −Kth subcarrier) is used for the transmitting pilot signal, it is possible to use any subcarrier for the transmitting pilot signal. In such case, equation (1-1) and equation (2-1) are respectively generalized as follows:

$$p_{Tx}(+K,n_1)p_{Tx}^*(-K,n_2) - p_{Tx}(+K,n_2)p_{Tx}^*(-K,n_1) \neq 0 \quad (1-2)$$

$$p_{Tx}(+K,n_1)p_{Tx}(+K,n_2) + p_{Tx}^*(-K,n_1)p_{Tx}(-K,n_2) = 0 \quad (2-2)$$

In other words, equation (1-2) expresses that the difference between the product of the transmitting pilot signal $pTx(+K,n_1)$ and the complex conjugate $pTx^*(-K,n_2)$ of the transmitting pilot signal $pTx(-K,n_2)$ and the product of the transmitting pilot signal $pTx(+K,n_2)$ and the complex conjugate $pTx^*(-K,n_1)$ of the transmitting pilot signal $pTx(-K,n_1)$ is non-zero.

Meanwhile, equation (2-2) expresses that the sum of the product of the transmitting pilot signals $pTx(+K,n_1)$ and $pTx(+K,n_2)$ and the product of the complex conjugate $pTx^*(-K,n_1)$ of the transmitting pilot signal $pTx(-K,n_1)$ and the complex conjugate $pTx^*(-K,n_2)$ of the transmitting pilot signal $pTx(-K,n_2)$ is zero.

By setting the transmitting pilot signals $pTx(+7,1)$, $pTx(-7,1)$, $pTx(+7,2)$ and $pTx(-7,2)$, or $pTx(+K,n_1)$, $pTx(-K,n_1)$, $pTx(+K,n_2)$ and $pTx(-K,n_2)$ as above, it is possible for the receiving side to estimate the amplitude and phase change caused by the IQ imbalance and the mutual interference quantity between subcarriers positioned symmetrical with respect to the center frequency as will be explained later. Based on this, the IQ imbalance compensation will be easily performed. In this case, the transmitting OFDM signal can take the frame structure of FIG. 4, which does not require a particular preamble signal, thereby having the advantage of not accompanying an increase in the overhead due to the preamble signal.

The OFDM receiver 103 in FIG. 1 will be explained using FIG. 5. The OFDM receiver 103 comprises an RF reception unit 501, an FFT (fast Fourier transform) unit 502, a distortion coefficient estimator 503, an IQ imbalance characteristic estimator 504, a channel estimator 505, a channel equalizer 506, an IQ imbalance compensator 507 and a decoder 508. The RF reception unit 501 converts the OFDM signal S501 received by the receiving antenna 104 into a baseband signal by frequency conversion, then into a digital signal S502. The digital signal S502 output from the RF reception unit 501 is input to the FFT unit 502, whereby a fast Fourier transform is applied in order to divide the signal into signals S503 for each subcarrier. Here, among the signals S503 for each subcarrier in a certain symbol, the signal corresponding to the kth subcarrier is described as $s_{Rx}(k)$. In addition, for simplicity, it is assumed that there is no time jitter of a channel response and IQ imbalance within a frame. In the case where the IQ imbalance occurs in the RF transmission unit 207, $s_{Rx}(k)$ can be expressed by the following equation.

$$s_{Rx}(k) = \alpha(k)s_{Tx}(k) + \beta(k)s_{Tx}^*(-k) + m(k) \quad (6)$$

where $s_{Tx}(k)$ represents a signal transmitted by the kth subcarrier, m(k) represents a noise signal to be added in the kth subcarrier, and * represents a complex conjugate calculation. $\alpha(k)$ and $\beta(k)$ are coefficients (hereinafter, referred to as distortion coefficients) both given uniquely by the channel response characteristics and the IQ imbalance (amplitude error and phase error) which occurs in the RF reception unit 207. They are respectively described as follows.

$$\alpha(k) = \frac{1}{2}h(k)(1 + \gamma_{IQ}^*) \quad (7)$$

$$\beta(k) = \frac{1}{2}h^*(-k)(1 - \gamma_{IQ}) \quad (8)$$

where h(k) is a channel response corresponding to the kth subcarrier, and $\gamma_{IQ}$ is the IQ imbalance characteristic given by $\gamma_{IQ} = g_{IQ} \exp(j\phi_{IQ})$ ($g_{IQ}$:amplitude error, $\phi_{IQ}$:phase error).

From equation (6), when the IQ imbalance occurs, it is understood that the signal received by the +kth subcarrier includes an interference component $\beta(k)s^*_{Tx}(-k)$ from a signal transmitted by the −kth subcarrier. The above interference given to a certain subcarrier by another subcarrier positioned symmetric from said subcarrier with respect to a center frequency on the frequency axis causes a problem by deteriorating the reception quality. In the first embodiment, the reception quality is improved by removing the interference component $\beta(k)s^*_{Tx}(-k)$ that occurs due to such IQ imbalance as follows.

Among the output signals S503 from the FFT unit 502, a received pilot signal corresponding to a transmitting pilot signal is input to the distortion coefficient estimator 503. Among the output signals S503 from the FFT unit 502, signals corresponding to the channel estimation preamble signal are input to the channel estimator 505, and signals corresponding to the data signal are input to the channel equalizer 506.

The distortion coefficient estimator 503 estimates a distortion coefficient with respect to the $\pm 7^{th}$ subcarrier corresponding to the received pilot signal, from the input received pilot signals in the $1^{st}$ symbol zone and the $2^{nd}$ symbol zone. Information S504 which indicates the distortion coefficient estimated by the distortion coefficient estimator 503 is given to the IQ imbalance characteristic estimator 504. In the IQ imbalance characteristic estimator 504, an IQ imbalance characteristic is estimated from the given distortion coefficient, and a signal S505 indicating said characteristic is given to the channel estimator 505 and the IQ imbalance compensator 507.

The channel estimator 505 estimates channel response by using the channel estimation preamble signal and the IQ imbalance characteristic S505 and inputs signal S506 indicating the estimated channel response to the channel equalizer 506. The channel equalizer 506 equalizes the data signal in accordance with the estimated channel response to remove channel distortion and outputs the equalized data signal S507 to the IQ imbalance compensator 507.

The IQ imbalance compensator 507 compensates the influence of the IQ imbalance for the data signal S507 input from the channel equalizer 506 using the IQ imbalance characteristic S505. The IQ imbalance compensator 507 outputs the data signal S508 having been compensated the influence of the IQ imbalance to the decoder 508. The decoder 508 decodes the compensated data signal S508 and outputs playback data S509 of the transmitting data.

The processes carried out in the distortion coefficient estimator 503, the IQ imbalance characteristic estimator 504, the channel estimator 505, the channel equalizer 506 and the IQ imbalance compensator 507 will be explained in detail as follows.

Firstly, the process carried out in the distortion coefficient estimator 503 will be explained. To start with, the distortion coefficient estimator 503 receives a received pilot signal of the $1^{st}$ symbol zone and the $2^{nd}$ symbol zone from the FFT unit 502. The received pilot signal of the nth symbol zone of the kth subcarrier is described as $p_{Rx}(k,n)$. A noise signal added to the nth symbol of the kth subcarrier is described as $m(k,n)$. In such case, the received pilot signals $p_{Rx}(+7,1)$ and $p_{Rx}(+7,2)$ of the $1^{st}$ and $2^{nd}$ symbol zones of the $+7^{th}$ subcarrier can be expressed by equation (6) as follows.

$$p_{Rx}(+7,1) = \alpha(+7)p_{Tx}(+7,1) + \beta(+7)p_{Tx}^*(-7,1) + m(+7,1) \quad (9)$$

$$p_{Rx}(+7,2) = \alpha(+7)p_{Tx}(+7,2) + \beta(+7)p_{Tx}^*(-7,2) + m(+7,2) \quad (10)$$

In other words, as received pilot signals $p_{Rx}(+7,1)$ and $p_{Rx}(+7,2)$ can be obtained over two symbol zones in the $+7^{th}$ subcarrier, it is possible to set up a simultaneous equation with respect to $\alpha(+7)$ and $\beta(+7)$ as in equations (9) and (10).

With that, from the values of the received pilot signals $p_{Rx}(+7,1)$ and $p_{Rx}(+7,2)$ and the known transmitting pilot signals $p_{Tx}(+7,1)$, $p_{Tx}(-7,1)$, $p_{Tx}(+7,2)$ and $p_{Tx}(-7,2)$, the distortion coefficient estimator 503 subsequently estimates the distortion coefficients $\alpha(+7)$ and $\beta(+7)$ concerning the $k=+7^{th}$ subcarrier, to which the transmitting pilot signal is allocated. Here, the coefficient $\alpha(+7)$ represents the amplitude and phase change component which occurs in the $k=+7^{th}$ subcarrier. $\beta(+7)$ represents the interference component given to the $k=+7^{th}$ subcarrier by the $k=-7^{th}$ subcarrier. When describing the estimation values of the distortion coefficients $\alpha(+7)$ and $\beta(+7)$ as $\alpha_{Est}(+7)$ and $\beta_{Est}(+7)$ respectively, the distortion coefficient estimator 503 calculates $\alpha_{Est}(+7)$, $\beta_{Est}(+7)$ by the calculation of the following equation.

$$\alpha_{Est}(+7) = \frac{p_{Tx}^*(-7,2)p_{Rx}(+7,1) - p_{Tx}^*(-7,1)p_{Rx}(+7,2)}{p_{Tx}(+7,1)p_{Tx}^*(-7,2) - p_{Tx}(+7,2)p_{Tx}^*(-7,1)} \quad (11\text{-}1)$$

$$\beta_{Est}(+7) = \frac{-p_{Tx}(+7,2)p_{Rx}(+7,1) + p_{Tx}(+7,1)p_{Rx}(+7,2)}{p_{Tx}(+7,1)p_{Tx}^*(-7,2) - p_{Tx}(+7,2)p_{Tx}^*(-7,1)} \quad (12\text{-}1)$$

As the transmitting pilot signals $p_{Tx}(+7,1)$, $p_{Tx}(-7,1)$, $p_{Tx}(+7,2)$ and $p_{Tx}(-7,2)$ satisfy equation (1-1), it is possible to calculate the distortion coefficients $\alpha_{Est}(+7)$ and $\beta_{Est}(+7)$ by the calculations of equations (11-1) and (12-1). In addition, in the case of ignoring the term of thermal noise ($m(k,n)=0$), when equations (9) and (10) are substituted into equation (11-1), it is understood that the estimation value of the distortion coefficient $\alpha_{Est}(+7)$ becomes the same value as the actual distortion coefficient $\alpha(+7)$. Similarly, when substituting equations (9) and (10) into equation (12-1), it is understood that the estimation value of the distortion coefficient $\beta_{Est}(+7)$ becomes the same value as the actual distortion coefficient $\beta(+7)$.

If the transmitting pilot signals $p_{Tx}(+7,1)$, $p_{Tx}(-7,1)$, $p_{Tx}(+7,2)$ and $p_{Tx}(-7,2)$ further satisfy equation (2-1), estimation accuracy of the distortion coefficients $\alpha_{Est}(+7)$, $\beta_{Est}(+7)$ in a thermal noise environment improves in comparison to the case of not satisfying the equation (2-1). The distortion coefficient estimator 503 supplies the signal S504 indicating $\alpha_{Est}(+7)$ and $\beta_{Est}(+7)$ estimated by the calculation of equations (11-1) and (12-1) to the IQ imbalance characteristic estimator 504.

Here, when generalizing equations (11-1) and (12-1) so as to correspond to equations (1-2) and (2-2), it can be described as follows.

$$\beta_{Est}(+7) = \frac{-p_{Tx}(+7,2)p_{Rx}(+7,1) + p_{Tx}(+7,1)p_{Rx}(+7,2)}{p_{Tx}(+7,1)p_{Tx}^*(-7,2) - p_{Tx}(+7,2)p_{Tx}^*(-7,1)} \quad (11\text{-}2)$$

$$\beta_{Est}(+K) = \frac{-p_{Tx}(+K,n_2)p_{Rx}(+K,n_1) + p_{Tx}(+K,n_1)p_{Rx}(+K,n_2)}{p_{Tx}(+K,n_1)p_{Tx}^*(-K,n_2) - p_{Tx}(+K,n_2)p_{Tx}^*(-K,n_1)} \quad (12\text{-}2)$$

The process carried out in the IQ imbalance characteristic estimator 504 will be explained. The IQ imbalance characteristic estimator 504 estimates an IQ imbalance characteristic $\gamma_{IQ}$ using the estimation value of the distortion coefficients $\alpha_{Est}(+7)$ and $\beta_{Est}(+7)$ received from the distortion coefficient estimator 503. When the estimated IQ imbalance characteristic, i.e., the estimation value of the IQ imbalance characteristic $\gamma_{IQ}$ is described as $\gamma_{Est}$, the IQ imbalance characteristic estimator 504 calculates $\gamma_{Est}$ by the following equation.

$$\gamma_{Est} = \frac{\alpha_{Est}(+7) - \beta_{Est}(+7)}{\alpha_{Est}(+7) + \beta_{Est}(+7)} \quad (13\text{-}1)$$

Here, equation (13-1) can be generalized using K so as to correspond to equations (11-2) and (12-2) as follows.

$$\gamma_{Est} = \frac{\alpha_{Est}(+K) - \beta_{Est}(+K)}{\alpha_{Est}(+K) + \beta_{Est}(+K)} \quad (13\text{-}2)$$

In the case of ignoring the terms of thermal noise ($m(k,n)=0$), $\alpha_{Est}(+7)=\alpha(+k)$ and $\beta_{Est}(+7)=\beta(+7)$. Therefore, it is understood that the estimation value $\gamma_{Est}$ of the IQ imbalance characteristic of equation (13-1) becomes the same value as the actual IQ imbalance characteristic $\gamma_{IQ}$, as described below.

$$\gamma_{Est} = \frac{\alpha_{Est}(+7) - \beta_{Est}(+7)}{\alpha_{Est}(+7) + \beta_{Est}(+7)} \quad (14)$$

$$= \frac{\alpha(+7) - \beta(+7)}{\alpha(+7) + \beta(+7)}$$

$$= \frac{\frac{1}{2}h(+7)(1+\gamma_{IQ}) - \frac{1}{2}h(+7)(1-\gamma_{IQ})}{\frac{1}{2}h(+7)(1+\gamma_{IQ}) + \frac{1}{2}h(+7)(1-\gamma_{IQ})}$$

$$= \gamma_{IQ}$$

The IQ imbalance characteristic estimator 504 supplies the calculated IQ imbalance characteristic $\gamma_{Est}$ to the channel estimator 505 and the IQ imbalance compensator 507 (S505).

The process carried out in the channel estimator 505 will be explained. The channel estimator 505 receives the received channel estimation preamble signal from the FFT unit 502. The received channel estimation preamble signal in the kth subcarrier is described as $b_{Rx}(k)$. In addition, the noise signal to be added to the received channel estimation preamble signal in the kth subcarrier is described as $m_b(k)$. In such case, the received channel estimation preamble signal $b_{Rx}(k)$ in the kth subcarrier can be expressed by equation (6) as follows.

$$b_{Rx}(k) = \alpha(k)b_{Tx}(k) + \beta(k)b_{Tx}^*(-k) + m_b(k) \quad (15)$$

$$= \frac{1}{2}h(k)\{(1+\gamma_{IQ})b_{Tx}(k) + (1-\gamma_{IQ})b_{Tx}^*(-k)\} + m_b(k)$$

The channel estimator 505 further receives the estimation value $\gamma_{Est}$ of the IQ imbalance characteristic from the IQ imbalance characteristic estimator 504.

$$d_{ChEq}(k, n) = d_{Rx}(k, n)/h_{Est}(k) \quad (20)$$

$$= \{\alpha(k)d_{Tx}(k, n) + \beta(k)d_{Tx}^*(-k, n)\}/h(k)$$

$$= \frac{1}{2}h(k)\{(1+\gamma_{IQ})d_{Tx}(k, n) +$$

$$(1-\gamma_{IQ})d_{Tx}^*(-k, n)\}/h(k)$$

$$= \frac{1}{2}\{(1+\gamma_{IQ})d_{Tx}(k, n) + (1-\gamma_{IQ})d_{Tx}^*(-k, n)\}$$

$$(k = \pm 1, \pm 2, \ldots, k \neq \pm 7, n = 1, 2, \ldots)$$

The channel equalizer 506 supplies the received data signal $d_{ChEq}(k,n)$ from which the influence of the channel is removed to the imbalance compensator 507 (S507).

The process carried out in the IQ imbalance compensator 507 will be explained. The IQ imbalance compensator 507 receives the received data signal $d_{ChEq}(k,n)$ output from the channel equalizer 506. When the estimation value of the IQ imbalance characteristic $\gamma_{Est}$ (S505) is input from the IQ imbalance characteristic estimator 504, the IQ imbalance compensator 507 performs compensation to remove influence of the IQ imbalance for the received data signal $d_{ChEq}(k,n)$. When the received data signal for which the influence of the IQ imbalance has been compensated is described as $d_{Est}(k,n)$, the IQ imbalance compensator 507 performs compensation for the received data signal $d_{Est}(k,n)$ by the calculation of the following equation.

The channel estimator 505 subsequently estimates the channel response characteristic h(k) from the received channel estimation preamble signal $b_{Rx}(k)$, the known transmitting channel estimation preamble signal $b_{Tx}(k)$ and the estimation value of the IQ imbalance characteristic $\gamma_{Est}$. When the estimation value of h(k) is described as $h_{Est}(k)$, the channel estimator 505 calculates $h_{Est}(k)$ by the following equation.

$$h_{Est}(k) = 2b_{Rx}(k)/\{(1+\gamma_{Est})b_{Tx}(k) + (1-\gamma_{Est})b_{Tx}^*(-k)\} \quad (16)$$

In the case of ignoring the term of thermal noise (m(k,n)=0, $m_b(k)$=0), when substituting equations (14) and (15) into equation (16), the estimation value of the channel response characteristic $h_{Est}(k)$ becomes identical with the actual channel response characteristic h(k) as described below.

$$h_{Est} = 2b_{Rx}(k)/\{(1+\gamma_{Est})b_{Tx}(k) + (1-\gamma_{Est})b_{Tx}^*(-k)\} \quad (17)$$

$$= 2 \cdot \frac{1}{2}h(k)\{(1+\gamma_{IQ})b_{Tx}(k) + (1-\gamma_{IQ})b_{Tx}^*(-k)\}/$$

$$\{(1+\gamma_{IQ})b_{Tx}(k) + (1-\gamma_{IQ})b_{Tx}^*(-k)\}$$

$$= h(k)$$

The channel estimator 505 supplies the estimated channel response characteristic $h_{Est}(k)$ to the channel equalizer 506 (S506).

The process carried out in the channel equalizer 506 will be explained. The channel equalizer 506 receives the received data signals output sequentially from the FFT unit 502. The data signal of the nth symbol in the kth subcarrier input from the FFT unit 502 is described as $d_{Rx}(k,n)$. $D_{Rx}(k,n)$ is obtained from the following equation by equation (6).

$$d_{Rx}(k,n) = \alpha(k)d_{Tx}(k,n) + \beta(k)d_{Tx}^*(-k,n) + m(k,n)$$

$$(k=\pm 1, \pm 2, \ldots, k \neq \pm 7, n=1, 2, \ldots) \quad (18)$$

where m(k,n) is a noise signal added to the data signal of the nth symbol in the kth subcarrier.

When the estimation value of the channel response characteristic $h_{Est}(k)$ is input from the channel estimator 505, the channel equalizer 506 applies a known channel equalization method to the received data signal $d_{Rx}(k,n)$ to obtain a received data signal $d_{ChEq}(k,n)$ from which the influence of the channel has been removed. For instance, the $d_{ChEq}(k,n)$ can be obtained by the following channel equalization method.

$$d_{ChEq}(k,n) = d_{Rx}(k,n)/h_{Est}(k)$$

$$(k=\pm 1, \pm 2, \ldots, k \neq \pm 7, n=1, 2, \ldots) \quad (19)$$

In the case of ignoring the term of thermal noise (m(k,n)=0, $m_b(k)$=0), when substituting equations (17) and (18) into equation (19), it is understood that the influence of the channel response characteristic h(k) is removed from the estimation value received data signal $d_{ChEq}(k,n)$ of the transmitting data signal as described in the following equation.

$$d_{Est}(k, n) = \quad (21)$$

$$\frac{1}{\gamma_{Est} + \gamma_{Est}^*}\{(1+\gamma_{Est}^*)d_{ChEq}(k,n) - (1-\gamma_{Est})d_{ChEq}^*(-k,n)\}$$

$$(k = \pm 1, \pm 2, \ldots, k \neq \pm 7, n = 1, 2, \ldots)$$

In the case of ignoring the term of thermal noise, when substituting equations (14) and (20) into equation (21), the received data signal $d_{Est}(k,n)$ obtained by compensating the influence of the IQ imbalance can be expressed by in the following equation.

$$d_{Est}(k,n) = \frac{1}{\gamma_{Est} + \gamma^*_{Est}} \left\{ \begin{array}{l} (1+\gamma^*_{Est})d_{ChEq}(k,n) - \\ (1-\gamma_{Est})d^*_{ChEq}(-k,n) \end{array} \right\} \quad (22)$$

$$= \frac{1}{\gamma_{IQ} + \gamma^*_{IQ}} \cdot \frac{1}{2} \left[ \begin{array}{l} (1+\gamma^*_{IQ}) \\ \left\{ \begin{array}{l} (1+\gamma^*_{IQ})(1+\gamma_{IQ})d_{Tx}(k,n) + \\ (1-\gamma_{IQ})d^*_{Tx}(-k,n) \end{array} \right\} - \\ (1-\gamma_{IQ}) \\ \left\{ \begin{array}{l} (1+\gamma^*_{IQ})d^*_{Tx}(-k,n) + \\ (1-\gamma^*_{IQ})d_{Tx}(k,n) \end{array} \right\} \end{array} \right]$$

$$= d_{Tx}(k,n)$$

$(k = \pm 1, \pm 2, \ldots, k \neq \pm 7, n = 1, 2, \ldots)$

From the above equation, it is understood that the interference caused by IQ imbalance between the subcarriers positioned symmetric with respect to a center frequency on the frequency axis is removed. As a result, the compensated transmitting data signal $d_{Est}(k,n)$ becomes the same value as the actual transmitting data signal $d_{Tx}(k,n)$, and the transmitting data signal can be decoded properly.

As explained above, in the OFDM receiver concerned in the first embodiment, the distortion coefficient regarding the subcarrier to which the transmitting pilot signal is allocated is estimated from the received pilot signal, and the influence of the IQ imbalance in the data signal is compensated by using the IQ imbalance characteristic calculated from the estimated distortion coefficient. By performing these estimations and compensation processes, the interference component between the subcarriers positioned symmetric with respect to a center frequency occurred due to an IQ imbalance can be removed as shown in equation (22), and the transmitting data signal can be demodulated with high accuracy. Further, in the OFDM receiver concerned in the first embodiment, the channel response characteristic is estimated by using the IQ imbalance characteristic which is calculated from the estimated distortion coefficient. Thus, as shown in equation (17), it is possible to estimate the channel response characteristic with high accuracy, without coming under the influence of the IQ imbalance. Consequently, the influence of the channel can be removed properly from the received data signal.

Second Embodiment

Figure 6:
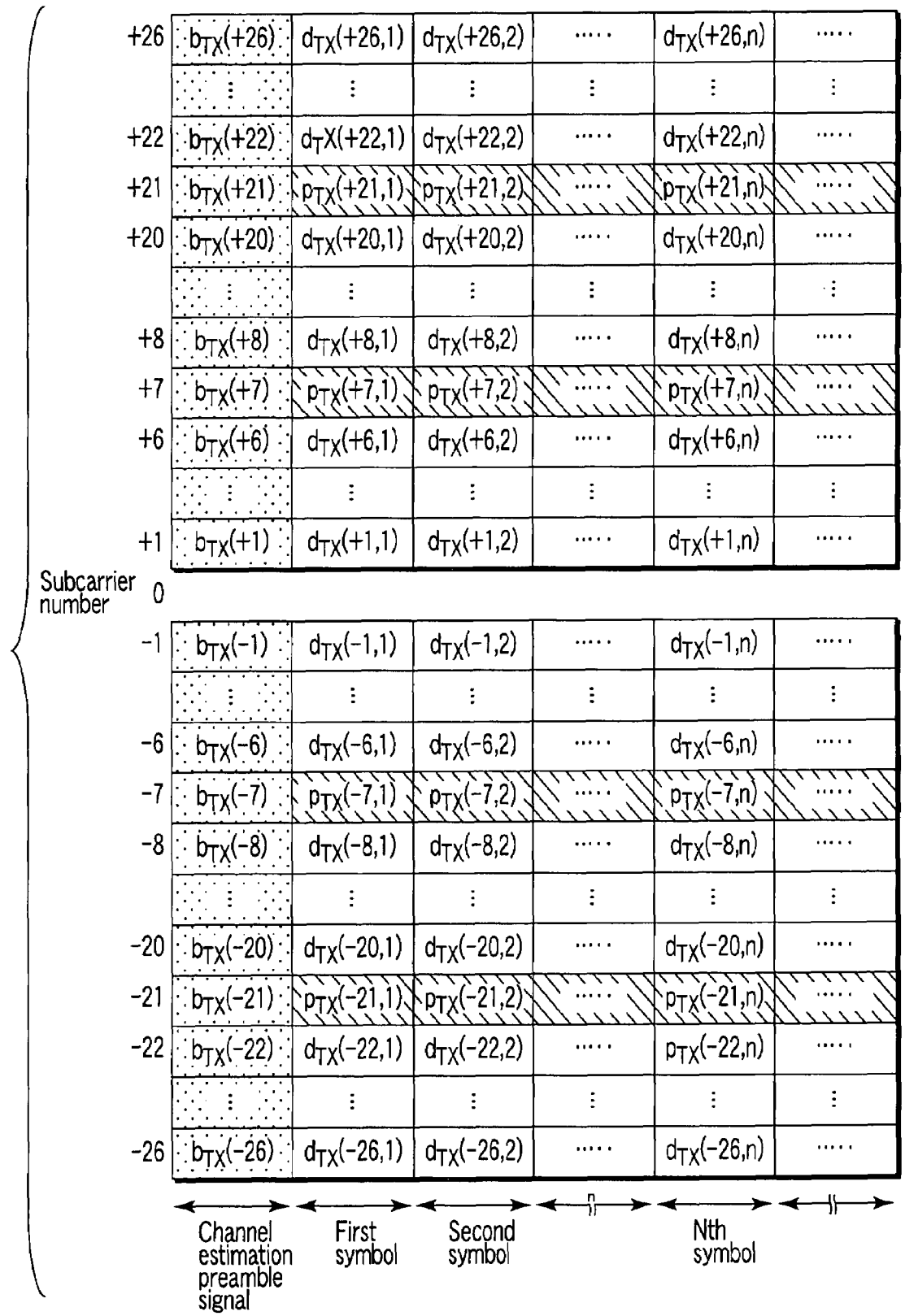
FIG. 6 shows a subcarrier arrangement of an OFDM signal transmitted according to the second embodiment.

FIG. 6 shows a frame structure of an OFDM signal transmitted by an OFDM transmitter in a second embodiment of the present invention. In the second embodiment, the subcarriers used for transmitting pilot signals are k=±7, ±21. However, this is not restricted, and as long as the subcarrier pairs (+Kth and −Kth subcarriers) being symmetric with respect to a center frequency ($0^{th}$ subcarrier) are used for the pilot signals, an arbitrary subcarrier can be used for transmitting the pilot signals. In addition, in the second embodiment, the number of subcarriers used for transmitting the pilot signals is 4. However, this is not restricted, and it is possible to use any even numbers of subcarriers.

In the second embodiment, the transmitting pilot signal $\{p_{Tx}(+k,n_1), p_{Tx}(-k,n_1)\}$ of the $n_1$st symbol zone and the pilot signal $\{p_{Tx}(+k,n_2), p_{Tx}(-k,n_2)\}$ of the $n_2$nd symbol zone satisfy the condition of the following equation.

$$p_{Tx}(+k,n_1)p_{Tx}(-k,n_2) - p_{Tx}(+k,n_2)p_{Tx}(-k,n_1) \neq 0$$

$(k=\pm 7, \pm 21)$ (23)

In addition, preferably, $\{p_{Tx}(+k,n_1), p_{Tx}(-k,n_1)\}$ and $\{p_{Tx}(+k,n_2), p_{Tx}(-k,n_2)\}$ satisfy the condition of the following equation.

$$p_{Tx}(+k,n_1)p_{Tx}(+k,n_2) + p_{Tx}^*(-k,n_1)p_{Tx}^*(-k,n_2) = 0$$

$(k=\pm 7, \pm 21)$ (24)

In the second embodiment, the combination of symbol numbers $\{n_1, n_2\}$ that satisfies equation (23) is $\{1, 2\}$. In other words, the pilot signal $\{p_{Tx}(+k,n_1), p_{Tx}(-k,n_1)\}$ of the $1^{st}$ symbol zone and the pilot signal $\{p_{Tx}(+k,n_2), p_{Tx}(-k,n_2)\}$ of the $2^{nd}$ symbol zone satisfy equation (23). In the second embodiment, the $1^{st}$ and $2^{nd}$ symbols include pilot signals which satisfy equation (23), however, this is not restricted, and the pilot signal satisfying equation (23) may be included in any two symbols (for example, the $3^{rd}$ symbol and the $7^{th}$ symbol, the preamble for channel estimation and the $4^{th}$ symbol).

The OFDM receiver concerned in the second embodiment of the present invention will be explained. The OFDM receiver concerned in the second embodiment is basically identical with FIG. 5 concerned in the first embodiment, except that only the operations of the distortion coefficient estimator 503 and the IQ imbalance characteristic estimator 504 are different. In the following, the operations of the distortion coefficient estimator 503 and the IQ imbalance characteristic estimator 504 used in the second embodiment will be explained.

Firstly, the process carried out in the distortion coefficient estimator 503 will be explained. To start with, the distortion coefficient estimator 503 receives a received pilot signal of the $1^{st}$ and $2^{nd}$ symbol zones output from the FFT unit 502. In this case, the received pilot signals $p_{Rx}(+k,1)$ and $p_{Rx}(+k,2)$ of the $1^{st}$ and $2^{nd}$ symbol zones in the k=±$7^{th}$, $21^{st}$ subcarrier can be described as in the following equations.

$$p_{Rx}(+k,1) = \alpha(+k)p_{Tx}(+k,1) + \beta(+k)p_{Tx}^*(-k,1) + m(+k,1) \quad (25)$$

$(k = \pm 7, \pm 21)$ $$p_{Rx}(+k,2) = \alpha(+k)p_{Tx}(+k,2) + \beta(+k)p_{Tx}^*(-k,2) + m(+k,2) \quad (26)$$

$(k = \pm 7, \pm 21)$

Then, from the values of received pilot signals $p_{Rx}(+k,1)$, $p_{Rx}(+k,2)$ and the known transmitting pilot signals $p_{Tx}(+k,1)$, $p_{Tx}(+k,2)$, the distortion coefficient estimator 503 estimates the distortion coefficients $\alpha(+k)$ and $\beta(+k)$ with respect to subcarrier k=±$7^{th}$, +$21^{st}$ to which the transmitting pilot signals are allocated. When the estimation value of the distortion coefficients $\alpha(+k)$ and $\beta(+k)$ are respectively described as $\alpha_{Est}(+k)$ and $\beta_{Est}(+k)$, the distortion coefficient estimator 503 calculates $\alpha_{Est}(+k)$ and $\beta_{Est}(+k)$ by the following equations.

$$\alpha_{Est}(+k) = \frac{p_{Tx}^*(-k,2)p_{Rx}(+k,1) - p_{Tx}^*(-k,1)p_{Rx}(+k,2)}{p_{Tx}(+k,1)p_{Tx}^*(-k,2) - p_{Tx}(+k,2)p_{Tx}^*(-k,1)} \quad (27)$$

$(k = \pm 7, \pm 21)$

-continued $$\beta_{Est}(+k) = \frac{-p_{Tx}(+k,2)p_{Rx}(+k,1) + p_{Tx}(+k,1)p_{Rx}(+k,2)}{p_{Tx}(+k,1)p_{Tx}^*(-k,2) - p_{Tx}(+k,2)p_{Tx}^*(-k,1)} \quad (28)$$

$$(k = \pm 7, \pm 21)$$

Since the transmitting pilot signals $p_{Tx}(+k,1)$, $p_{Tx}(+k,2)$ satisfy equation (23), it is possible to calculate the distortion coefficients $\alpha_{Est}(+k)$ and $\beta_{Est}(+k)$ by calculating equations (27) and (28). In addition, in the case of ignoring the term of thermal noise (m(k,n)=0), when equations (25) and (26) are substituted into equation (27), it is understood that the estimation value of the distortion coefficient $\alpha_{Est}(+k)$ becomes identical values with the actual distortion coefficient $\alpha(+k)$. Similarly, when equations (25) and (26) are substituted into equation (28), it is understood that the estimation value of the distortion coefficient $\beta_{Est}(+k)$ becomes identical values with the actual distortion coefficient $\beta(+k)$.

In the case where the transmitting pilot signals $p_{Tx}(+k,1)$, $p_{Tx}(+k,2)$ further satisfy equation (24), compared to the case of unsatisfying equation (24), the estimation accuracy of $\alpha_{Est}(+k)$ and $\beta_{Est}(+k)$ in a thermal noise environment improves. The distortion coefficient estimator 503 supplies signal S504 to the IQ imbalance characteristic estimator 504. The signal S504 indicates the distortion coefficients $\alpha_{Est}(+k)$ and $\beta_{Est}(+k)$ with respect to subcarrier k=$\pm 7^{th}$, $\pm 21^{st}$ which is estimated by calculating equations (27) and (28).

The process carried out in the IQ imbalance characteristic estimator 504 will be explained. The IQ imbalance characteristic estimator 504 estimates the IQ imbalance characteristic $\gamma_{IQ}$ using the distortion coefficients $\alpha_{Est}(+k)$ and $\beta_{Est}(+k)$ with respect to subcarrier k=$\pm 7^{th}$, $\pm 21^{st}$ which are received from the distortion coefficient estimator 503. When the IQ imbalance characteristic estimated by using the distortion coefficients $\alpha_{Est}(+k)$ and $\beta_{Est}(+k)$ with respect to subcarrier k=$\pm 7^{th}$, $\pm 21^{st}$ is described as $\gamma_{Est}(+k)$, the IQ imbalance characteristic estimator 504 calculates $\gamma_{Est}(+k)$ by the following equation.

$$\gamma_{Est}(+k) = \frac{\alpha_{Est}(+k) - \beta_{Est}(+k)}{\alpha_{Est}(+k) + \beta_{Est}(+k)} \quad (29)$$

$$(k = \pm 7, \pm 21)$$

The IQ imbalance characteristic estimator 504 averages the IQ imbalance characteristic $\gamma_{Est}(+k)$ estimated with respect to subcarrier k=$\pm 7^{th}$, $\pm 21^{st}$ as in the following equation in order to obtain a conclusive IQ imbalance characteristic estimation value $\gamma_{Est}$.

$$\gamma_{Est} = \frac{1}{4} \sum_{k=\{\pm 7, \pm 21\}} \gamma_{Est}(k) \quad (30)$$

In the case of ignoring the term of thermal noise (m(k,n)=0), $\alpha_{Est}(+k)=\alpha(+k)$ and $\beta_{Est}(+k)=\beta(+k)$ are established. Therefore, it is understood that the estimation value of the IQ imbalance characteristic $\gamma_{Est}$ becomes identical values with the actual IQ imbalance characteristic $\gamma_{IQ}$.

$$\gamma_{Est} = \frac{1}{4} \sum_{k=\{\pm 7, \pm 21\}} \gamma_{Est}(k) \quad (31)$$

$$= \frac{1}{4} \sum_{k=\{\pm 7, \pm 21\}} \frac{\alpha_{Est}(+k) - \beta_{Est}(+k)}{\alpha_{Est}(+k) + \beta_{Est}(+k)}$$

$$= \frac{1}{4} \sum_{k=\{\pm 7, \pm 21\}} \frac{\alpha(+k) - \beta(+k)}{\alpha(+k) + \beta(+k)}$$

$$= \frac{1}{4} \sum_{k=\{\pm 7, \pm 21\}} \frac{\frac{1}{2}h(k)(1+\gamma_{IQ}) - \frac{1}{2}h(k)(1-\gamma_{IQ})}{\frac{1}{2}h(k)(1+\gamma_{IQ}) + \frac{1}{2}h(k)(1-\gamma_{IQ})}$$

$$= \gamma_{IQ}$$

In the second embodiment, as shown in the above equation, the conclusive IQ imbalance characteristic $\gamma_{Est}$ is estimated by averaging the IQ imbalance characteristic $\gamma_{Est}(+k)$ estimated with respect to all subcarriers (subcarrier k=$\pm 7^{th}$, $\pm 21^{st}$) by which the pilot signals are transmitted. However, this is not restricted. Therefore, as in the example of the following equation, it is also possible to estimate the conclusive IQ imbalance characteristic $\gamma_{Est}$ by averaging the IQ balance characteristic $\gamma_{Est}(+k)$ estimated with respect some of the subcarriers by which the pilot signals are transmitted.

$$\gamma_{Est} = \frac{1}{4} \sum_{k=\{+7,-21\}} \gamma_{Est}(k) \quad (32)$$

Meanwhile, in the case of averaging as in the above equation, the calculations of (27), (28) and (29) need to be carried out only for the k=$+7^{th}$, $21^{st}$ subcarrier and not for the k=$+7^{th}$, $-21^{st}$ subcarrier.

Further, in the second embodiment, as shown in equation (30), the IQ imbalance characteristic $\gamma_{Est}(+k)$ estimated with respect to a plurality of subcarriers by which the pilot signals are transmitted is averaged with the same weight. However, this is not restricted. Therefore, averaging may be carried out by multiplying each $\gamma_{Est}(+k)$ estimated with respect to each subcarrier by a different weight as in the example of the next equation.

$$\gamma_{Est} = \frac{1}{4} \sum_{k=\{+7,-21\}} \rho(k)\gamma_{Est}(k) \quad (33)$$

The IQ imbalance characteristic estimator 504 supplies the calculated IQ imbalance characteristic $\gamma_{Est}$ to the channel estimator 505 and the IQ imbalance compensator 507 (S505).

In the second embodiment, as shown in equation (32), the conclusive IQ imbalance characteristic $\gamma_{Est}$ is calculated by averaging the IQ imbalance characteristic $\gamma_{Est}(+k)$ which is estimated with respect to a plurality of subcarriers by which the pilot signals are transmitted. Therefore, compared to the first embodiment, the estimation accuracy of the IQ imbalance characteristic under the thermal noise environment improves. As a result, the accuracy of the channel response characteristic in the channel estimator 505 and the compensation accuracy in the IQ imbalance compensator 507 can be improved.

As mentioned above, in the embodiments of the present invention, pilot signals used generally in frequency synchronization or timing synchronization in the OFDM wireless communication system have a specific condition added and transmitted. Because of this, the mutual interference quantity between the subcarriers positioned symmetric with respect to the center frequency, which is caused by the IQ imbalance of the quadrature modulator, can be estimated by the receiving side without using a particular preamble signal with a large overhead. Based on the estimation result, the IQ imbalance can be compensated.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A wireless communication method comprising:
generating an OFDM signal containing a first OFDM symbol having a first transmitting pilot signal and a second transmitting pilot signal respectively allocated to a first subcarrier and a second subcarrier being symmetric with respect to a center frequency on a frequency axis, and a second OFDM symbol having a third transmitting pilot signal and a fourth transmitting pilot signal known to the transmitting side and the receiving side respectively allocated to the first subcarrier and the second subcarrier, a difference between a product of the first transmitting pilot signal and a complex conjugate of the fourth transmitting pilot signal and a product of the third transmitting pilot signal and a complex conjugate of the second transmitting pilot signal being non-zero;
transmitting the OFDM signal after applying a quadrature modulation;
receiving the transmitted OFDM signal to output a received OFDM signal;
extracting a first received pilot signal corresponding to the first subcarrier in the first OFDM symbol zone of the received OFDM signal;
extracting a second received pilot signal corresponding to the first subcarrier in the second OFDM symbol zone of the received OFDM signal;
estimating a first coefficient representing a change component of an amplitude and a phase which occur in the first subcarrier, and a second coefficient representing an interference component provided to the first subcarrier by the second subcarrier, using the first received pilot signal and the second received pilot signal;
estimating from the first coefficient and the second coefficient an IQ imbalance characteristic uniquely determining an amplitude error and a phase error occurred upon the quadrature modulation of the transmitted OFDM signal;
compensating an influence of the amplitude error and phase error for the received OFDM signal in accordance with the IQ imbalance characteristic; and
decoding the compensated OFDM signal.

2. The method according to claim 1, wherein, in the transmitted OFDM signal, a sum of the product of the first transmitting pilot signal and the third transmitting pilot signal and the product of the complex conjugate of the second transmitting pilot signal and the complex conjugate of the fourth transmitting pilot signal is zero.

3. An OFDM receiving method comprising:
receiving an OFDM signal transmitted after undergone quadrature modulation, the OFDM signal including a first OFDM symbol having a first transmitting pilot signal and a second transmitting pilot signal allocated respectively to a first subcarrier and a second subcarrier positioned symmetric on the frequency axis with respect to a center frequency, and a second OFDM symbol having a third transmitting pilot signal and a fourth transmitting pilot signal allocated respectively to the first subcarrier and the second subcarrier to output a received OFDM signal, a difference between a product of the first transmitting pilot signal and a complex conjugate of the fourth transmitting pilot signal and the product of the third transmitting pilot signal and a complex conjugate of the second transmitting pilot signal being non-zero;
estimating a first coefficient representing a change component of an amplitude and a phase which occur in the first subcarrier, and a second coefficient representing an interference component provided to the first subcarrier by the second subcarrier, using a first received pilot signal corresponding to the first transmitting pilot signal within the received OFDM signal, and a second received pilot signal corresponding to the third transmitting pilot signal within the received OFDM signal;
estimating from the first coefficient and the second coefficient an IQ imbalance characteristic uniquely determining an influence of an amplitude error and a phase error occurred upon the quadrature modulation of the transmitted OFDM signal;
compensating the influence of the amplitude error and phase error for the receiving OFDM signal in accordance with the IQ imbalance characteristic; and
decoding the compensated OFDM signal.

4. The method according to claim 3, wherein, in the transmitted OFDM signal, a sum of a product of the first transmitting pilot signal and the third transmitting pilot signal and the product of the complex conjugate of the second transmitting pilot signal and the complex conjugate of the fourth transmitting pilot signal is zero.

5. The method according to claim 3, wherein the estimating the first coefficient and the second coefficient estimates the first coefficient by a following expression;

$$\frac{p_{Tx}^*(-K, n_2)p_{Rx}(+K, n_1) - p_{Tx}^*(-K, n_1)p_{Rx}(+K, n_2)}{p_{Tx}(+K, n_1)p_{Tx}^*(-K, n_2) - p_{Tx}(+K, n_2)p_{Tx}^*(-K, n_1)}$$

where, $p_{Tx}(+K, n_1)$, $p_{Tx}(-K, n_1)$, $p_{Tx}(+K, n_2)$ and $p_{Tx}(-K, n2)$ respectively represent the first transmitting pilot signal, the second transmitting pilot signal, the third transmitting pilot signal and the fourth transmitting pilot signal, $p_{Rx}(+K, n_1)$ and $p_{Rx}(+K, n_2)$ respectively represent the first received pilot signal and the second received pilot signal, and * represents complex conjugate calculation.

6. The method according to claim 3, wherein the estimating the first coefficient and the second coefficient estimates the second coefficient by a following expression;

$$\frac{-p_{Tx}(+K, n_2)p_{Rx}(+K, n_1) + p_{Tx}(+K, n_1)p_{Rx}(+K, n_2)}{p_{Tx}(+K, n_1)p_{Tx}^*(-K, n_2) - p_{Tx}(+K, n_2)p_{Tx}^*(-K, n_1)}$$

where, $p_{Tx}(+K, n_1)$, $p_{Tx}(-K, n_1)$, $p_{Tx}(+K, n_2)$ and $p_{Tx}(-K, n2)$ respectively represent the first transmitting pilot signal, the second transmitting pilot signal, the third transmitting pilot signal and the fourth transmitting pilot signal, $p_{Rx}(+K, n_1)$ and $p_{Rx}(+K, n_2)$ respectively represent the first received pilot signal and the second received pilot signal, and * represents complex conjugate calculation.

7. The method according to claim 3, wherein, when the amplitude error is described as $g_{IQ}$ and the phase error is described as $\phi_{IQ}$, the IQ imbalance characteristic is obtained by $\gamma_{IQ} = g_{IQ} \exp(j\phi_{IQ})$.

8. The method according to claim 3, wherein the estimating the IQ imbalance estimates the IQ imbalance characteristic by the following expression;

$$\frac{\alpha_{Est}(+K) - \beta_{Est}(+K)}{\alpha_{Est}(+K) + \beta_{Est}(+K)}$$

where, $\alpha_{Est}(+K)$ and $\beta_{Est}(-K)$ respectively represent the first coefficient and the second coefficient.

9. The method according to claim 3, wherein the estimating the IQ imbalance estimates the IQ imbalance characteristic by averaging a value of the following expression;

$$\frac{\alpha_{Est}(+K) - \beta_{Est}(+K)}{\alpha_{Est}(+K) + \beta_{Est}(+K)}$$

where, $\alpha_{Est}(+K)$ and $\beta_{Est}(-K)$ represent the first coefficient and the second coefficient, and * represents complex conjugate calculation.

10. The method according to claim 3, wherein the transmitted OFDM signal comprises a fourth OFDM symbol having a first transmitting information signal and a second transmitting information signal respectively allocated to a third subcarrier, and the compensating compensates a first @received information signal corresponding to the first transmitting information signal within the received OFDM signal and a second received information signal corresponding to the second transmitting information signal within the received OFDM signal by the following expression;

$$\frac{1}{\gamma_{Est} + \gamma_{Est}^*}\{(1 + \gamma_{Est}^*)d_{ChEq}(k, n) - (1 - \gamma_{Est})d_{ChEq}^*(-k, n)\}$$

where, $d_{ChEq}(k)$ represents a first received information signal, $d_{ChEq}(-k)$ represents a second received information signal, $\gamma_{Est}$ represents the IQ imbalance characteristic, and * represents a complex conjugate calculation.

11. The method according to claim 3, wherein the transmitted OFDM signal further comprises a third OFDM symbol having a first transmitting preamble signal and a second transmitting preamble signal respectively allocated to a third subcarrier and a fourth subcarrier positioned symmetric with regard to a center frequency on the frequency axis; and further comprising estimating a channel response characteristic corresponding to the third subcarrier from a first received preamble signal corresponding to the first transmitting preamble signal within the received OFDM signal, a second preamble signal corresponding to the second transmitting preamble signal within the received OFDM signal and the estimated IQ imbalance characteristic, by the following expression;

$$b_{Rx}(k)/\{(1+\gamma_{Est})b_{Tx}(k)+(1-\gamma_{Est})b_{Tx}^*(-k)\}$$

where, $b_{Rx}(k)$ represents a first received preamble signal, $b_{Rx}(-k)$ represents a second received preamble signal, $\gamma_{Est}$ represents the estimated IQ imbalance characteristic, and * represents a complex conjugate calculation.

12. An OFDM receiver comprising:

a reception unit configured to receive an OFDM signal transmitted after undergone quadrature modulation, the OFDM signal including a first OFDM symbol having a first transmitting pilot signal and a second transmitting pilot signal allocated respectively to a first subcarrier and a second subcarrier positioned symmetric on the frequency axis with respect to a center frequency, and a second OFDM symbol having a third transmitting pilot signal and a fourth transmitting pilot signal allocated respectively to the first subcarrier and the second subcarrier to output a received OFDM signal, a difference between a product of the first transmitting pilot signal and a complex conjugate of the fourth transmitting pilot signal and the product of the third transmitting pilot signal and a complex conjugate of the second transmitting pilot signal being non-zero;

a first estimator to estimate a first coefficient representing a change component of an amplitude and a phase occurred in the first subcarrier, and a second coefficient representing an interference component provided to the first subcarrier by the second subcarrier using a first received pilot signal corresponding to the first transmitting pilot signal within the received OFDM signal and a second received pilot signal corresponding to the third transmitting pilot signal within the received OFDM signal;

a second estimator to estimate from the first coefficient and the second coefficient an IQ imbalance characteristic uniquely determining an influence of an amplitude error and a phase error occurred upon the quadrature modulation of the transmitted OFDM signal;

a compensator to compensate the influence of the amplitude error and the phase error for the received OFDM signal in accordance with the IQ imbalance characteristic; and a decoder to decode the compensated OFDM signal.

13. The receiver according to claim 12, wherein, in the transmitted OFDM signal, a sum of a product of the first transmitting pilot signal and the third transmitting pilot signal and a product of the complex conjugate of the second transmitting pilot signal and the complex conjugate of the fourth transmitting pilot signal is zero.

14. The receiver according to claim 12, wherein the first estimator estimates the first coefficient by a following expression;

$$\frac{p_{Tx}^*(-K, n_2)p_{Rx}(+K, n_1) - p_{Tx}^*(-K, n_1)p_{Rx}(+K, n_2)}{p_{Tx}(+K, n_1)p_{Tx}^*(-K, n_2) - p_{Tx}(+K, n_2)p_{Tx}^*(-K, n_1)}$$

where, $p_{Tx}(+K,n_1)$, $p_{Tx}(-K,n_1)$, $p_{Tx}(+K,n_2)$ and $p_{Tx}(-K,n2)$ respectively represent the first transmitting pilot signal, the second transmitting pilot signal, the third transmitting pilot signal and the fourth transmitting pilot signal, $p_{Rx}(+K,n_1)$ and $p_{Rx}(+K,n_2)$ respectively represent the first received pilot signal and the second received pilot signal, and * represents complex conjugate calculation.

15. The receiver according to claim 2, wherein the first estimator estimates the second coefficient by a following expression;

$$\frac{-p_{Tx}(+K,n_2)p_{Rx}(+K,n_1) + p_{Tx}(+K,n_1)p_{Rx}(+K,n_2)}{p_{Tx}(+K,n_1)p^*_{Tx}(-K,n_2) - p_{Tx}(+K,n_2)p^*_{Tx}(-K,n_1)}$$

where, $p_{Tx}(+K,n_1)$, $p_{Tx}(-K,n_1)$, $p_{Tx}(+K,n_2)$ and $p_{Tx}(-K,n2)$ respectively represent the first transmitting pilot signal, the second transmitting pilot signal, the third transmitting pilot signal and the fourth transmitting pilot signal, $p_{Rx}(+K,n_1)$ and $p_{Rx}(+K,n_2)$ respectively represent the first received pilot signal and the second received pilot signal, and * represents complex conjugate calculation.

16. The receiver according to claim 12, wherein, when the amplitude error is described as $g_{IQ}$ and the phase error is described as $\phi_{IQ}$, the IQ imbalance characteristic is obtained by $\gamma_{IQ} = g_{IQ} \exp(j\phi_{IQ})$.

17. The receiver according to claim 12, wherein the second estimator estimates the IQ imbalance characteristic by the following expression;

$$\frac{\alpha_{Est}(+K) - \beta_{Est}(+K)}{\alpha_{Est}(+K) + \beta_{Est}(+K)}$$

where, $\alpha_{Est}(+K)$ and $\beta_{Est}(-K)$ respectively represent the first coefficient and the second coefficient.

18. The receiver according to claim 12, wherein the second estimator estimates the IQ imbalance characteristic by averaging a value of the following equation;

$$\frac{\alpha_{Est}(+K) - \beta_{Est}(+K)}{\alpha_{Est}(+K) + \beta_{Est}(+K)}$$

where, $\alpha_{Est}(+K)$ and $\beta_{Est}(-K)$ represent the first coefficient and the second coefficient, and * represents complex conjugate calculation.

19. The receiver according to claim 12, wherein the transmitted OFDM signal comprises a fourth OFDM symbol having a first transmitting information signal and a second transmitting information signal respectively allocated to a third subcarrier, and the compensator compensates a first @received information signal corresponding to the first transmitting information signal within the received OFDM signal and a second received information signal corresponding to the second transmitting information signal within the received OFDM signal by the following expression;

$$\frac{1}{\gamma_{Est} + \gamma^*_{Est}} \{(1 + \gamma^*_{Est})d_{ChEq}(k,n) - (1 - \gamma_{Est})d^*_{ChEq}(-k,n)\}$$

where, $d_{ChEq}(k)$ represents a first received information signal, $d_{ChEq}(-k)$ represents a second received information signal, $\gamma_{Est}$ represents the IQ imbalance characteristic, and * represents a complex conjugate calculation.

20. The receiver according to claim 12, wherein the transmitted OFDM signal further comprises a third OFDM symbol having a first transmitting preamble signal and a second transmitting preamble signal respectively allocated to a third subcarrier and a fourth subcarrier positioned symmetric with regard to a center frequency on the frequency axis; and further comprising a channel estimator to estimate a channel response characteristic corresponding to the third subcarrier from a first received preamble signal corresponding to the first transmitting preamble signal within the received OFDM signal, a second preamble signal corresponding to the second transmitting preamble signal within the received OFDM signal and the estimated IQ imbalance characteristic, by the following expression;

$$b_{Rx}(k)/\{(1+\gamma_{Est})b_{Tx}(k)+(1-\gamma_{Est})b_{Tx}(-k)\}$$

where, $b_{Rx}(k)$ represents a first received preamble signal, $b_{Rx}(-k)$ represents a second received preamble signal, $\gamma_{Est}$ represents the estimated IQ imbalance characteristic, and * represents a complex conjugate calculation.

* * * * *